Figure 1:
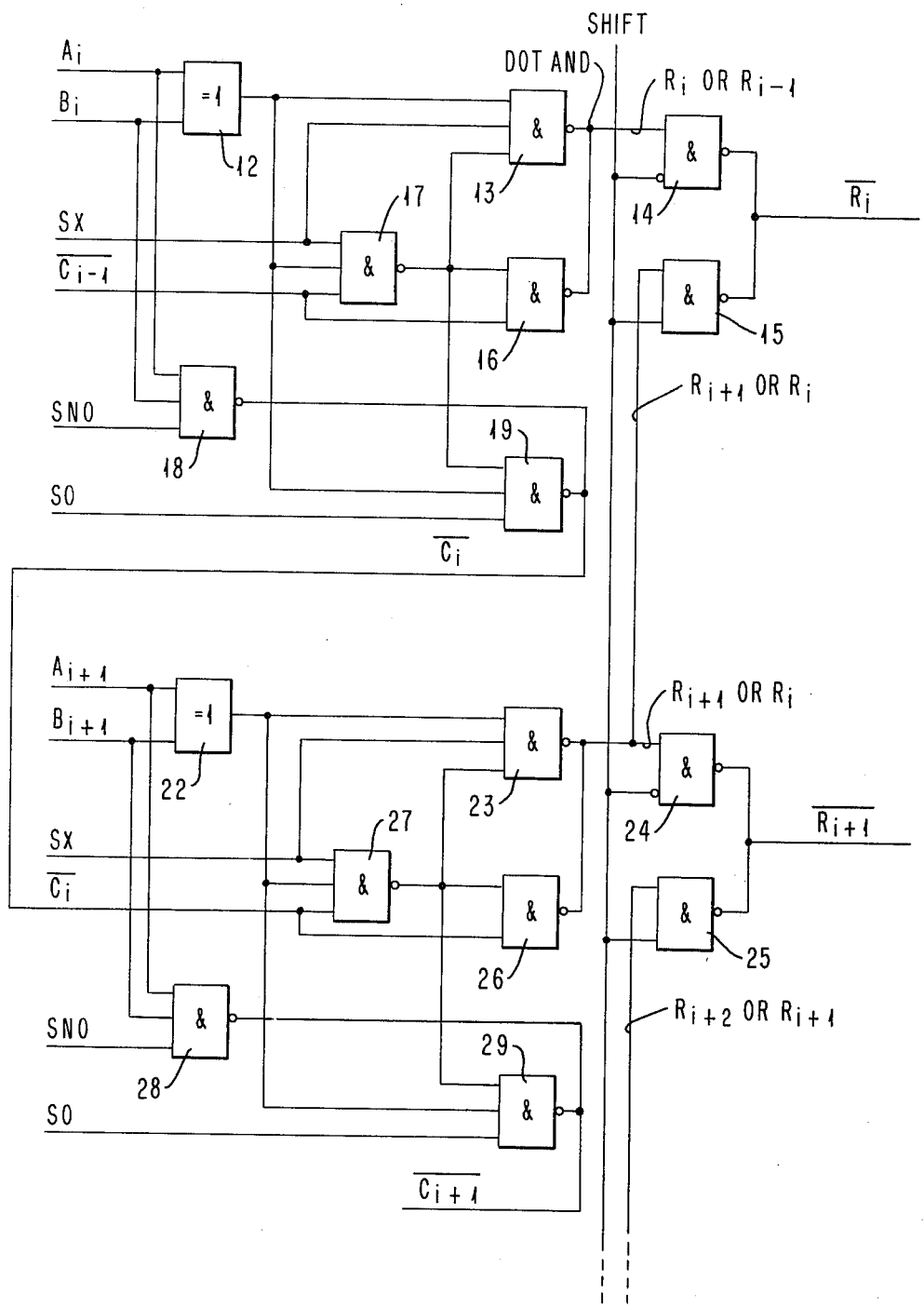

United States Patent [19]

Kaufman et al.

[11] 4,435,782

[45] Mar. 6, 1984

[54] DATA PROCESSING SYSTEM WITH HIGH DENSITY ARITHMETIC AND LOGIC UNIT

[75] Inventors: Dan R. Kaufman, Kingston; Gerhard R. Thompson, Wappingers Falls, both of N.Y.

[73] Assignee: International Business Machines Corp., Armonk, N.Y.

[21] Appl. No.: 278,794

[22] Filed: Jun. 29, 1981

[51] Int. Cl.³ .............................. G06F 7/48; G06F 7/50
[52] U.S. Cl. .................................. 364/716; 364/784; 307/471
[58] Field of Search ...................... 364/716, 784, 786; 307/445, 465, 471, 472

[56] References Cited

U.S. PATENT DOCUMENTS 3,454,751  7/1969  Brastins et al. ................. 364/716 X
4,218,747  8/1980  Miura ................................. 364/716
4,349,888  9/1982  Smith ................................. 364/716

Primary Examiner—Jerry Smith
Assistant Examiner—Gary V. Harkcom
Attorney, Agent, or Firm—W. S. Robertson

[57] ABSTRACT

A multi-stage, multi-function, arithmetic and logic unit for a data processing system is formed with only a small number of components. Some of the functions (Sum and Exclusive OR) are performed within each stage. For other functions (AND and OR), some of the components of one stage cooperate with different components of the next stage in an arrangement that reduces the total number of components for each stage. For these functions, the output appears shifted one bit position to the left and is then re-shifted one bit position to the right by a conventionally available shifter.

6 Claims, 7 Drawing Figures

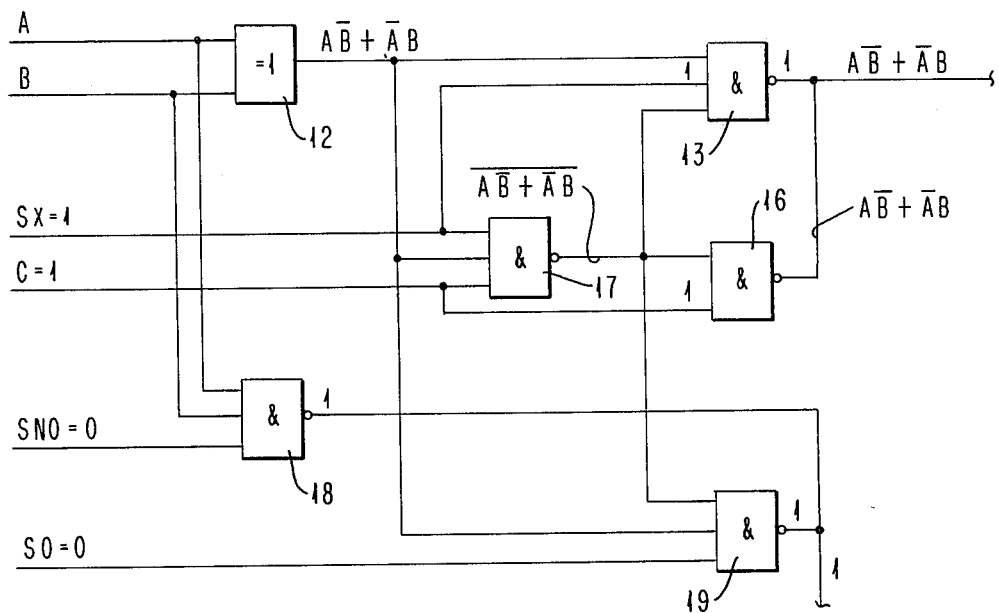
FIG. 2 EXCLUSIVE OR
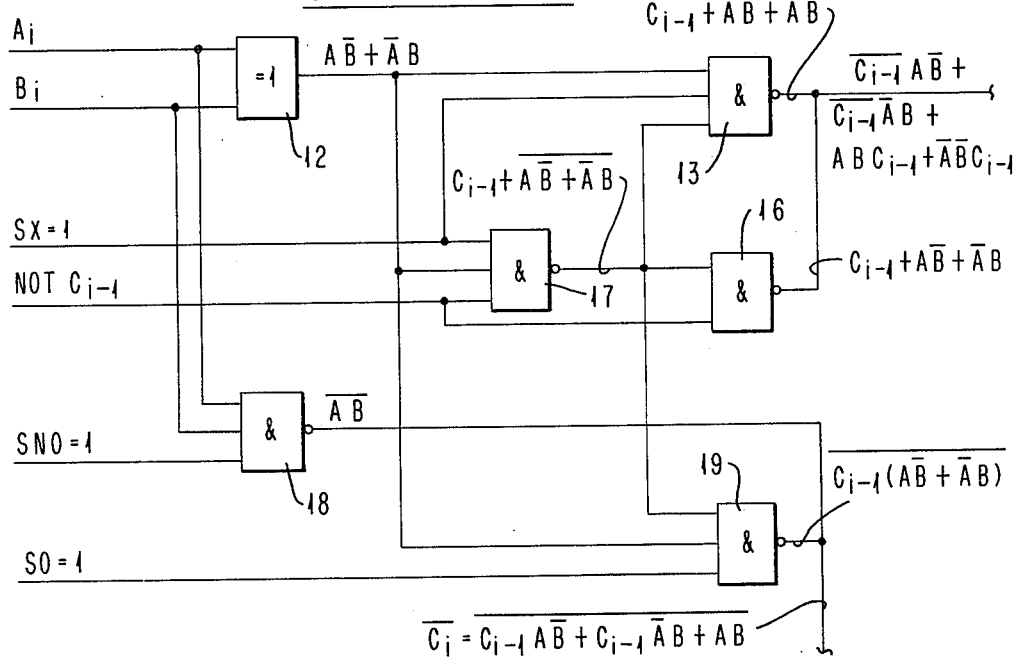
FIG. 3 SUM AND CARRY

DATA PROCESSING SYSTEM WITH HIGH DENSITY ARITHMETIC AND LOGIC UNIT

FIELD OF THE INVENTION

This invention relates to an improved arithmetic and logic unit.

BACKGROUND

Although arithmetic and logic units are well known in data processing systems, it will be helpful to review the features and the terminology that particularly apply to this invention. The unit ordinarily operates on two multi-bit words that will be called A and B or will be designated as $[A_0 \ldots A_n]$ and $[B_0 \ldots B_n]$ to emphasize the individual bit positions of the words and the corresponding stages of the arithmetic and logic unit. The unit has a generally similar stage for each bit position and a generalized stage can be designated as stage i with a stage to the right designated $i-1$ and a stage to the left designated $i+1$. Each stage receives the two bits for the corresponding position from the two data words, $A_i$ and $B_i$ and it receives control signals that define the desired one of several arithmetic and logic operations. This arithmetic operation is addition. Subtraction, multiplication and division are performed in part by addition and are not directly relevant in this description. The usual logic functions are Exclusive OR, AND and OR.

For addition, each stage produces an output called the sum, and it also produces an output that is called a carry (or carry out) that is supplied to the next stage (where it is called a carry in). The sum bits form a multi-bit output and the high order carry signal forms a high order sum bit or an overflow bit but does not ordinarily otherwise appear as an output. When the unit performs a logic function, the multi-bit output appears on the same lines as the sum output. The unit also typically includes a shifter that permits shifting the output to the right or left.

SUMMARY OF THE INVENTION

Thus, an arithmetic and logic unit is complex, and its circuit components form a significant portion of the total number of components of a processor. Where an entire processor is formed on a chip, the space occupied by the arithmetic and logic unit is significant. A general object of this invention is to provide a new arithmetic and logic unit that uses only a small number of gates and thereby requires a smaller area on a semiconductor chip.

It will be helpful to think of the components of each stage of the arithmetic and logic unit as being divided into two parts. (There will be some overlap of components in this division.) One part (to be called the sum logic) operates on inputs, including the carry in, to produce a signal at the sum output, and the other part (to be called the carry logic) operates on inputs including bits $A_i$ and $B_i$ of the data word, to produce a signal at the carry output. In this invention, for the AND function and the OR function, the carry logic components of one stage are combined with the sum logic components of the next stage (to the left) to form the selected function at the sum output of the next stage. That is, an output $A_i$ AND $B_i$ or $A_i$ OR $B_i$ appears at the sum output for stage $i+1$. This output is then shifted to the right one bit position so that it appears as the normal AND or OR function output for the corresponding input variables. The sum logic components of each stage are also arranged to form the sum and the Exclusive OR functions for the inputs to the stage, and the carry logic for a particular stage is arranged to form the carry when the add operation is performed.

Other objects and features of the invention will be apparent from the description of a preferred embodiment of the invention.

THE DRAWING

FIG. 1 shows two representative stages of the arithmetic and logic unit of the data processor of this invention.

FIGS. 2 through 5 each show one stage of the arithmetic and logic unit of FIG. 1 with legends to illustrate the operations Exclusive OR, Sum and Carry, AND and OR respectively.

Figure 6:
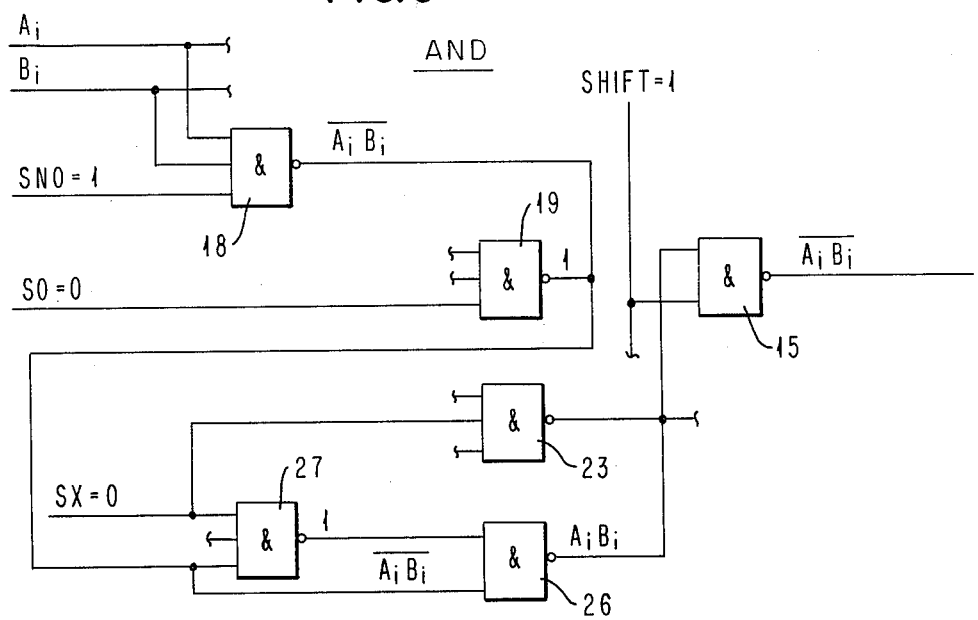
Figure 7:
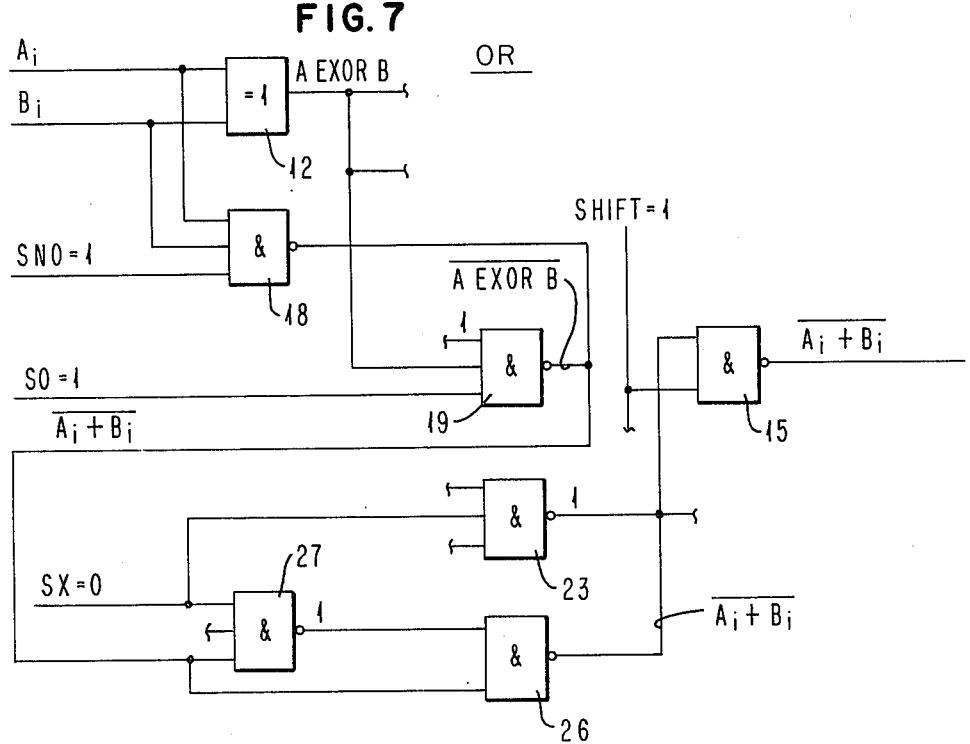

FIGS. 6 and 7 show two adjacent stages of the arithmetic and logic unit with some components removed to provide an alternative explanation of the operations AND and OR respectively.

THE PREFERRED EMBODIMENT

FIG. 1 shows two adjacent stages, i and $i+1$, of the preferred arithmetic and logic unit. Stage i has components 12 to 19 and stage $i+1$ has corresponding components 22 to 29. These components will be described later. The inputs $A_i$ and $B_i$ to stage i and $A_{i+1}$ and $B_{i+1}$ to stage $i+1$ follow the system of notation introduced earlier. The sum output appears at the DOT AND connection of gates 13 and 16 (and 23 and 26). The carry output appears at the DOT AND connection of gates 18 and 19 (and 28 and 29), and the carry in appears at the inputs to gates 16 and 17 (and 26 and 27). The carry in is in its complement form, $\overline{C_{i-1}}$ but the phase of this signal will usually be referred to in this description only if it is particularly significant.

Each stage receives three signals SX, SNO, and SO which are conventionally available or are derived from available signals that control a conventional arithmetic and logic unit to perform one of the four functions. This relationship is shown in Table 1.

TABLE 1

| FUNCTION | SO | SX | SNO |
|---|---|---|---|
| SUM | 1 | 1 | 1 |
| AND | 0 | 0 | 1 |
| OR | 1 | 0 | 1 |
| Exclusive OR | 0 | 1 | 0 |

This signal transformation can be provided by conventional combinatorial logic that will be evident from Table 1, since the signal of a column heading SO, SX or SNO is the OR logic function of the Function column where a 1 appears in the column.

A shifter is formed by logic blocks 14 and 15 for stage i and 24 and 25 for stage $i+1$, the DOT AND connection of their outputs, and a control line that carries a signal called SHIFT. The shifter is well known and the drawing is greatly simplified to show only components that provide a shift of one bit position to the right (up in the drawing). When SHxFT=0, gate 14 is enabled and gate 15 is disabled, and the sum output of stage i, designated $R_i$, appears in its complement form $\overline{R_i}$ at the output for stage i. As will be explained later, stage i produces the output $R_{i-1}$ for the AND and OR functions and the logic output $R_i$ appears at the sum output of stage $i+1$. When SHIFT=1, gate 15 is enabled and gate 14 is disabled to produce a shift of one bit to the right to maintain the position of output Ri regardless of the operation.

The following descriptions of the arithmetic and logic operations of the unit will explain both the details of the circuit and also the broader aspects that are applicable to other embodiments of the invention.

The Exclusive OR Function—FIG. 2

When a control signal SNO, SO, or SX has a 1 logic level it enables an AND Invert gate to produce either a 1 or a 0 at its output according to the AND Invert logic function of the other inputs to the gate. As an example, consider gate 18. In the general case the output is $\overline{(SNO)(A_i)(B_i)}$ or, equivalently, $\overline{SNO} + \overline{A_i} + \overline{B_i}$. When SNO=1 (and $\overline{SNO}=0$), this logic expression reduces to $\overline{A_iB_i}$ (or equivalently, $\overline{A_i} + \overline{B_i}$). Thus, when the control signal to a gate is set to a 1 logic level, the gate is "enabled". From a more general standpoint, a gate of any logic function will be called enabled when a control signal is the logic value (0 or 1) that causes the control signal logic term to be a 1 in a logical product form of the output or a 0 in a logical sum form of the output of the gate.

Similarly, when a control signal input to an AND Invert gate is a logical 0, the gate produces a 1 level output regardless of the state of the other inputs to the gate, and the gate can be called "disabled". (From a more general standpoint, the control signals appear as a 1 in a sum output and as a 0 in a product output.) Note that the output of a disabled gate is itself an enabling signal.

Gate 12 directly forms the Exclusive OR function, $A_i\overline{B_i} + \overline{A_i}B_i$ (which can also be written A EXOR B) at its output. There are many well known Exclusive OR circuits, and the function can also be implemented as several interconnected logic gates, as is well known. The output of gate 12 is not used directly as the Exclusive OR function because the outputs of other gates must be considered. Gate 17 is enabled by its control input SX=1 and by the value of the carry in, C=1 (explained later) so that it acts as a simple inverter on the input from gate 12. Gate 13 receives the signal SX=1 (which is not relevant to this function since the gate is otherwise disabled) and it receives the outputs of gates 12 and 17. Since the outputs of gates 12 and 17 are complements (because gate 17 inverts the output of gate 12), one of these two inputs to gate 13 is necessarily a 0, and gate 13 is disabled by logic signals rather than directly by control signals as in the previous examples. Gate 16 receives the enabling signal C=1 at one input and it receives the complement Exclusive OR function at its other input, and it acts as a simple inverter to recomplement this signal, which appears at the DOT AND connection of the outputs of gates 13 and 16. Since gate 13 produces a logical 1 level as already explained, the output of the DOT AND is the Exclusive OR function $A\overline{B} + \overline{A}B$.

The control signal SNO=0 disables gate 18 and the control signal SO=0 disables gate 19 so that the signal C=1, already introduced in this description, is produced at the DOT AND connection of the outputs of these gates.

The Sum and Carry—FIG. 3

This function can be understood as a continuation of the preceeding description when it is recalled that the sum is the Exclusive OR function of the inputs $A_i$ and $B_i$ with the carry in $C_{i-1}$. (The Exclusive OR function is associative and commutative.) For this operation the control signal SX is set to a 1 logic level as in the Exclusive OR function, but the control signals SNO and SO are also both set to 1, in contrast to the Exclusive OR operation just described.

As will be explained later, the Carry in signal $C_{i-1}$ has either a 0 or 1 value, depending on the arithmetic results of the stage to the right. Gate 17 is enabled by the signal SX=1, and it forms the logic function $(NOT(\overline{C_{i-1}} \text{ and } (A \text{ EXOR } B))$ or, equivalently, as shown in the drawing, $C_{i-1} + NOT (A \text{ EXOR } B)$. The signal SX=1 also enables gate 13 to respond to the outputs of gates 12 and 17 to produce the logic function NOT ((A EXOR B) AND ($C_{i-1}$+(NOT A EXOR B))). This output simplifies to $(NOT(C_{i-1}))$ OR (NOT(A EXOR B)), as the legend in the drawing shows.

Gate 16 receives the inputs NOT $C_{i-1}$ and $C_{i-1}$+NOT A EXOR B and produces the AND Invert function NOT ((NOT $C_{i-1}$)($C_{i-1}$+NOT A EXOR B)) which simplifies to the expression shown in the drawing $C_{i-1}$+A EXOR B. The AND function at the dotted outputs of gates 13 and 16 can be understood readily from the fact that the complement terms cancel in the AND function to produce $\overline{C_{i-1}}$ (A EXOR B)+$C_{i-1}$ (NOT (A EXOR B)) which gives the sum of products shown in the drawing. Each of these terms represents an odd number of 1 bits in the inputs $A_i$, $B_i$ and $C_{i-1}$.

The carry out function is a 1 if two or more of $A_i$, $B_i$ and $C_{i-1}$ are 1's. The circuit produces the complement carry out $\overline{C_i}$ at the DOT AND connection of gates 18 and 19. Gate 18 is enabled by the control signal SNO=1 and gate 19 is enabled by the control signal SO=1. The term AB in the carry out expression can be traced to gate 18. The terms $C_{i-1}\overline{A}B$ and $C_{i-1}A\overline{B}$ are formed by gate 19 from the inputs it receives from gates 12 and 17.

Figure 4:
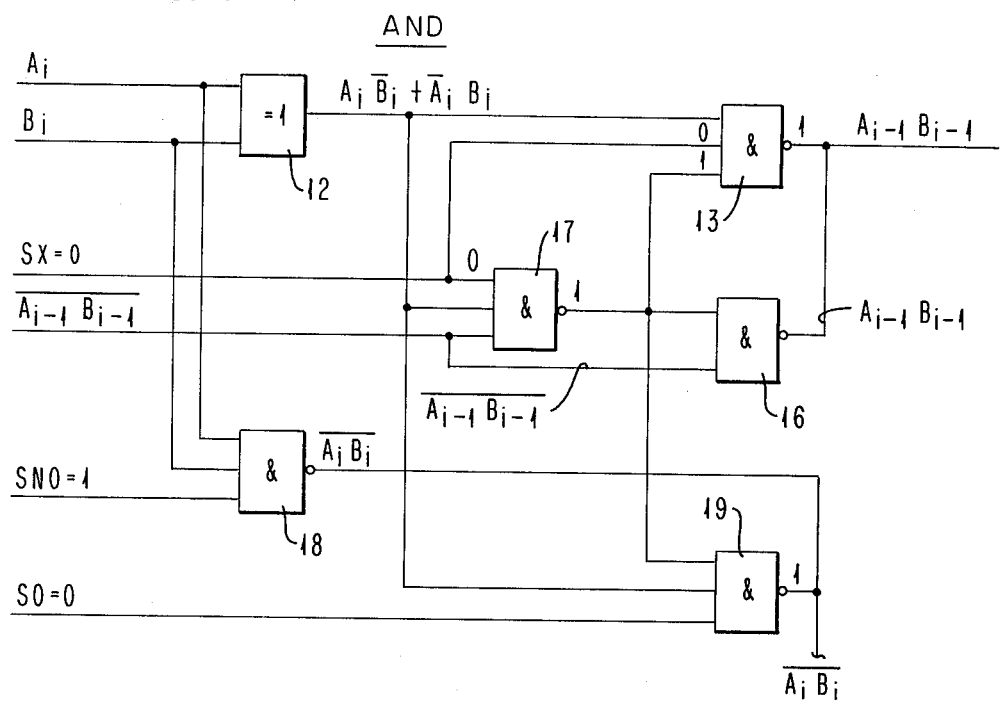

The AND Function—FIG. 4

The carry logic components produce the complement AND function at the DOT AND connection of gates 18 and 19, and the sum components receive the corresponding signal from the preceeding stage and invert it. The output product $A_{i-1} B_{i-1}$ is then shifted to the right (up in the drawing) by the shifter of FIG. 1 to realign the output with the input.

For this operation, the control signal SNO=1 enables gain 18 and the signal SO=0 disables gate 19 so that the product $\overline{A_iB_i}$ appears as the carry out of stage i. The control signal SX=0 disables gate 17, and the 1 output of gate 17 enables gate 16 to act as a simple inverter on the carry in $\overline{A_{i-1} B_{i-1}}$. The control signal SX=0 also disables gate 13 so that the product output of gate 16, $A_{i-1} B_{i-1}$, appears at the sum output of stage i.

The AND Function—FIG. 6

FIG. 6 shows only the components of the two stages of FIG. 1 that take part in the AND logic function, and it provides an alternative description of the apparatus just described in relation to FIG. 4. Gate 18 is enabled by the control signal SNO=1 and it forms the AND Invert logic function on its inputs $A_i$ and $B_i$. Gate 26 inverts this signal and gate 15 is enabled by the signal SHIFT=1 to produce the inverted function at the output of stage i. Gates 19, 23 and 27 (and corresponding gates 29, 13 and 17) are disabled by the control signals SX=0 and SO=0.

Figure 5:
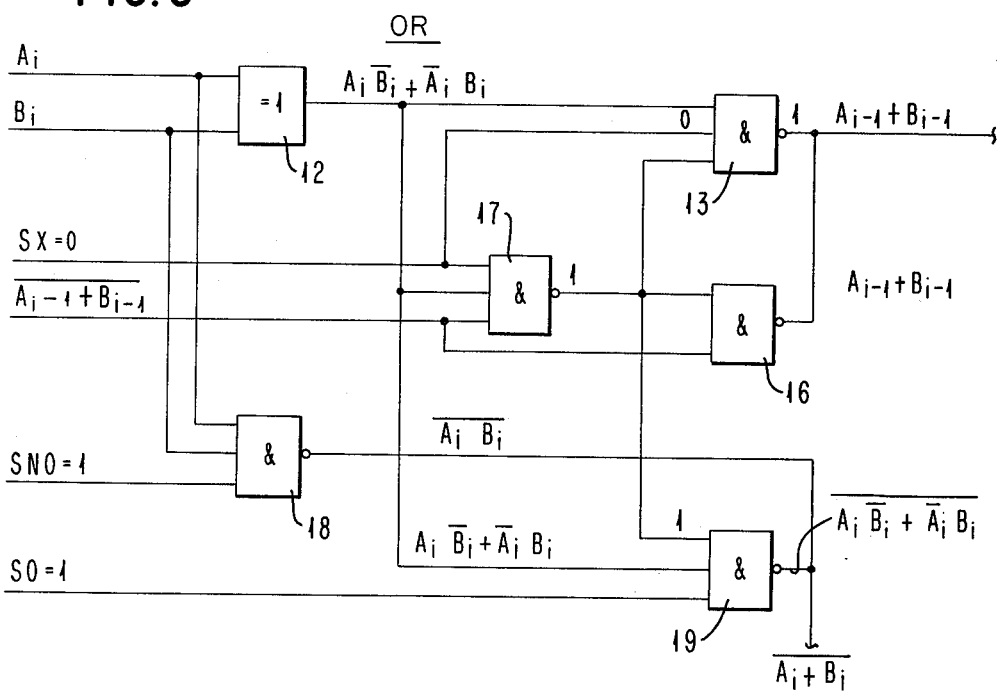

The OR Logic Function—FIG. 5

In the single stage of FIG. 5, the carry logic receives the logic variables $A_i$ and $B_i$ and produces the logic function $\overline{A_i+B_i}$ at the carry output of gate 19. The sum logic operates on the carry in from stage $i-1$, $\overline{A_{i-1}+B_{i-1}}$ to produce the signal $A_{i-1}+B_{i-1}$ at the output of gate 13. The shift circuit responds to the signal SHIFT=1 to shift this signal one bit position to the right so that the logical sums are aligned with the corresponding bits of the input variables A and B.

In the carry logic path, gate 18 is enabled by the control signal SNO=1 to form the AND Invert function $\overline{A_i B_i}$ at its output. The control signal SX=0 disables gate 17 to produce another 1 bit at an input of gate 19 so that gate 19 acts as a simple inverter on its input A EXOR B from gate 12. In the DOT AND connection of gates 18 and 19, the outputs combine as $\overline{(A_i B_i)} \, (A_i B_i + \overline{A_i} \, \overline{B_i}) = (\overline{A_i} + \overline{B_i})(A_i B_i + \overline{A_i} \, \overline{B_i}) = \overline{A_i} \, \overline{B_i}$ which is shown in the legend in the drawing in the equivalent from $\overline{A_i + B_i}$.

The control signal SX=0 disables gates 13 and 17 so that gate 16 acts as a simple inverter in the way that has already been described for the AND logic function to produce the ooutputs $A_{i-1} + B_{i-1}$.

FIG. 7 provides an alternative description of the OR function, and it can be understood without specific comment from the preceeding explanation of FIG. 6 which is similar in organization and from the preceeding description of the OR function.

Other Embodiments

The circuit that has been described in detail will be preferred for many applications, but the circuit can be readily modified, for example to use OR-Invert logic blocks, or for other purposes within the spirit of the invention and the scope of the claims.

Having thus described our invention, what we claim as new, and desire to secure by Letters Patent is:

1. A processor chip having means for supplying two multi-bit data words on which arithmetic and logic operations are to be performed and having means supplying control signals defining an operation to be performed, a multi-stage arithmetic and logic unit having for each stage a sum output and a carry output, two inputs for receiving the corresponding bits of the two multi-bit data words and an input for receiving a carry output from a preceeding stage, comprising, means responsive to the data inputs and to control signals defining a predetermined logic function to form at the carry output of the stage a logic function of the data input bits to the stage and to form at the sum output of the stage a logic function of the carry input to the stage, the two functions combining in two adjacent stages to produce said predetermined function, and means for shifting the sum outputs of the arithmetic and logic unit one bit position to the right to realign the output bits.

2. An arithmetic and logic unit comprising, for each stage, means (12, 18, 19) for receiving two bits ($A_i$ and $B_i$) of two data words that are to be ANDed or ORed and receiving a control signal (SO) defining the AND or OR logic function and for producing the complement AND or OR function at a Carry output of the stage, means (13, 16, 17) responsive to the complement AND or OR function at the Carry input from the preceeding stage to invert the function at the Sum output of the stage, and means for shifting the logic function at the Sum output one bit position to the right.

3. An aritmethic and logic unit comprising, for each stage, first logic means (12) for receiving a first and a second input ($A_i$ and $B_i$) and producing their Exclusive OR function, second logic means (17) connected to receive a third input (Complement Carry In) from a preceeding stage and the output of the first logic means to produce the complement Exclusive OR function when the third input has a fixed enabling value and to produce a function of the those inputs when the third input has a binary value representing a arithmetic or logic operation of the preceeding stage, third logic means (13) receiving the outputs of the first logic means (12) and the second logic means (17), the third logic means being disabled when the two outputs are complements, fourth logic means (18 and 19) responsive to control signal means (SNO and SO) for producing an output forming said third input at a next stage, fifth logic means (16) connected to receive the output of the second logic means (17) and the third input to invert the output of the second logic means (17) when the third input has the enabling value and to form a function of said outputs when said third input has said binary value representing an arithmetic or logic operation of said preceeding stage, sixth logic means (DOT AND) combining the outputs of the third (13) and fifth (16) logic means to produce the Sum when the third input is a binary value carry function and to produce the Exclusive OR function when the third signal has an enabling value.

4. The arithmetic and logic unit of claim 3 wherein said fourth logic means includes, a first gate (18) for forming the AND Invert function of said first and second inputs ($A_i$ and $B_i$), a second gate (19), means (DOT AND) connecting the outputs of said gates to form said third input to the next stage, said control signal means comprising a first control signal means (SNO) for enabling said first gate (18) and a second control signal means (SO) for disabling said second gate (19) to perform an AND logic function, whereby said AND Invert function appears at said third input of the next stage, and wherein said arithmetic and logic unit further includes third control signal means (SX) for disabling said second logic means (17) and said third logic means (13) whereby said fifth logic means (16) is enabled to form the AND logic function of the first and second inputs to the preceding stage, and means for shifting said AND logic function one bit position to the right.

5. The arithmetic and logic unit of claim 4, including means connecting said second gate (19) to receive the Exclusive OR output of said first logic means (12) to produce the complement OR function at said third input of said next stage when said first and second gates (18, 19) are enabled by said first (SNO) and second (SO) control signal means.

6. The arithmetic and logic unit of claim 5 including means connecting the output of said second logic means (17) to the next stage when said gates are all enabled for an Add operation.

* * * * *